United States Patent [19]
Ueng

[11] Patent Number: 6,139,036
[45] Date of Patent: Oct. 31, 2000

[54] SPURRING DEVICE CAPABLE OF ACCELERATING THE SPEED OF A BICYCLE UPON RELEASE OF THE BICYCLE FROM A BRAKED STATE

[76] Inventor: Shou-Nan Ueng, 133 Baron La., E. Brunswick, N.J. 08816

[21] Appl. No.: 09/290,108

[22] Filed: Apr. 12, 1999

[51] Int. Cl.[7] ................................................. B62M 1/10
[52] U.S. Cl. ........................................................... 280/212
[58] Field of Search .................................. 280/212, 214, 280/215

[56] References Cited

U.S. PATENT DOCUMENTS

| | | | |
|---|---|---|---|
| 784,345 | 3/1905 | Pepper | 280/212 |
| 2,638,359 | 5/1953 | Crumble | 280/215 |
| 2,965,393 | 12/1960 | Cauchon | 280/212 |
| 6,053,830 | 4/2000 | Glaeser | 280/215 |

FOREIGN PATENT DOCUMENTS

| | | | |
|---|---|---|---|
| 8140 | 1/1906 | Denmark | 280/215 |

*Primary Examiner*—Kevin Hurley
*Assistant Examiner*—Elaine Gort

*Attorney, Agent, or Firm*—Vedder Price Kaufman & Kammholz

[57] ABSTRACT

A spurring device includes a carriage lever pivoted on a mounting frame around a pivot axis parallel to a rotating axis of a rear sprocket wheel of a bicycle. The carriage lever has a front lifted portion and a rear depressed portion opposite to each other relative to the pivot axis. The front lifted portion is adapted to be pulled by a manually operated brake cable to move upwards to bring the rear depressed portion towards a rear tire of the bicycle. A rear axle is rotatably mounted on the rear depressed portion around a rotating axis parallel to the pivot axis. A frictional rotary member is mounted on and is rotatable with the rear axle to frictionally engage the rear tire when the rear depressed portion is brought towards the rear tire so as to be driven together with the rear axle to rotate clockwise. Simultaneously, a first biasing member is disposed on the rear axle to accumulate a biasing force for urging the rear axle to rotate counterclockwise. A transmission sprocket wheel is rotatable with the rear axle, and is coupled with the rear sprocket wheel so as to be driven by the latter to rotate counterclockwise. The transmission sprocket wheel can transmit the rotation force of the rear axle to drive the rear sprocket wheel to rotate counterclockwise once the front lifted portion is relieved from being pulled.

2 Claims, 3 Drawing Sheets

SPURRING DEVICE CAPABLE OF ACCELERATING THE SPEED OF A BICYCLE UPON RELEASE OF THE BICYCLE FROM A BRAKED STATE

BACKGROUND OF THE INVENTION

1. Field of the Invention

This invention relates to a spurring device, more particularly to a spurring device capable of accelerating the speed of a bicycle upon release of the bicycle from a braked state.

2. Description of the Related Art

For a bicycle-rider, it generally requires much effort to actuate once again a bicycle upon release of the bicycle from a braked state. As such, when the bicycle is used on a busy street, the rider easily feels fatigued owing to the repeated braking and actuating actions.

SUMMARY OF THE INVENTION

The object of the present invention is to provide a spurring device which is capable of accelerating the speed of a bicycle upon release of the bicycle from a braked state.

According to this invention, the spurring device includes a mounting frame adapted to be mounted above a rear tire of a bicycle. A carriage lever is disposed in and is pivotally mounted on the mounting frame around a pivot axis parallel to a first rotating axis of a rear sprocket wheel of the bicycle. The carriage lever has a front lifted portion and a rear depressed portion opposite to each other relative to the pivot axis. The front lifted portion is adapted to be pulled by a manually operated brake cable to move upwards for displacement from a first position to a second position such that when the front lifted portion is moved to the second position, the rear depressed portion is adapted to be brought towards the rear tire. A rear axle is disposed transverse to and is rotatably mounted on the rear depressed portion around a second rotating axis parallel to the pivot axis. A frictional rotary member is mounted on and is rotatable with the rear axle. When the rear depressed portion is brought towards the rear tire, the frictional rotary member will be adapted to frictionally engage the rear tire so as to be driven together with the rear axle to rotate clockwise. A first biasing member is disposed on the rear axle to accumulate a biasing force for urging the rear axle to rotate counterclockwise when the frictional rotary member is frictionally driven by the rear tire to rotate clockwise. A second biasing member is disposed to bias the front lifted portion to move to the first position. A transmission sprocket wheel is disposed to be rotatable with the rear axle, and is adapted to be coupled with the rear sprocket wheel.

As such, the transmission sprocket wheel is driven by the rear sprocket wheel to rotate counterclockwise when the front lifted portion is not pulled by the manually operated brake cable, and can transmit the rotation force of the rear axle which is driven by the first biasing member in order to drive the rear sprocket wheel to rotate counterclockwise once the front lifted portion is relieved from being pulled. Therefore, the user can easily accelerate the speed of the bicycle upon release of the bicycle from a braked state.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
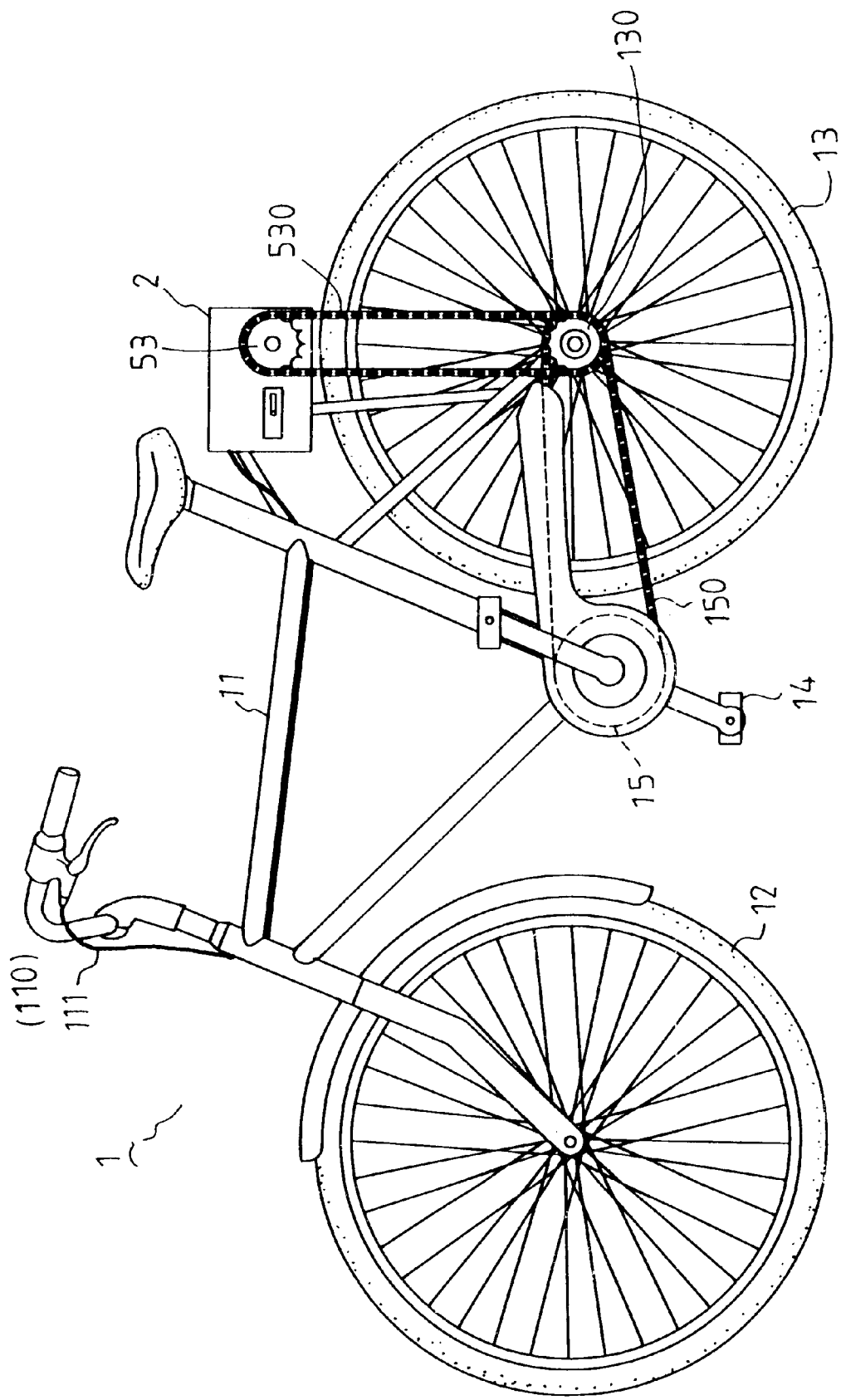
FIG. 1 is a side view showing the spurring device of this invention mounted on a bicycle.

Referring to FIG. 1, the preferred embodiment of the spurring device 2 according to the present invention is shown to be mounted on a bicycle frame 11. The bicycle 1 includes front and rear wheels 12,13 with front and rear tires, a chain wheel 15 driven by a pedal 14, and a rear sprocket wheel 130 defining a first rotating axis and cooperating with the chain wheel 15 via a drive chain 150 to uni-directionally drive the rear wheel 13 to rotate counterclockwise. A right manually operated brake cable 110 and a left manually operated check cable 111 are mounted on the frame 11.

Figure 2:
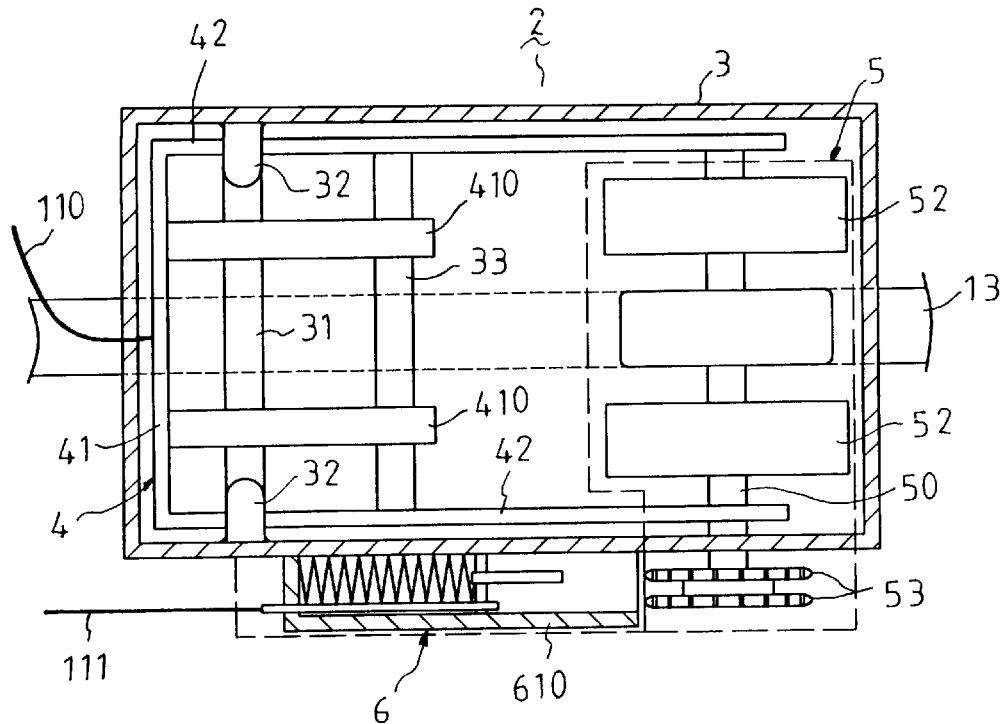
FIG. 2 is a top schematic partly sectional view of a preferred embodiment of the spurring device according to this invention.

With reference to FIG. 2, the spurring device 2 includes a mounting frame 3 which is disposed on the bicycle frame 11 above the rear wheel 13 and which extends in a longitudinal direction to have front and rear ends, a carriage lever 4 which is disposed in the mounting frame 3 at the front end, an energy storage mechanism 5 which is disposed in the mounting frame 3 at the rear end, and a check mechanism 6.

The mounting frame 3 has a mounting rod 31 with two connecting ends 32 which are secured on the mounting frame 3 at the front end, and which extend parallel to the first rotating axis so as to define a pivot axis.

Figure 4:
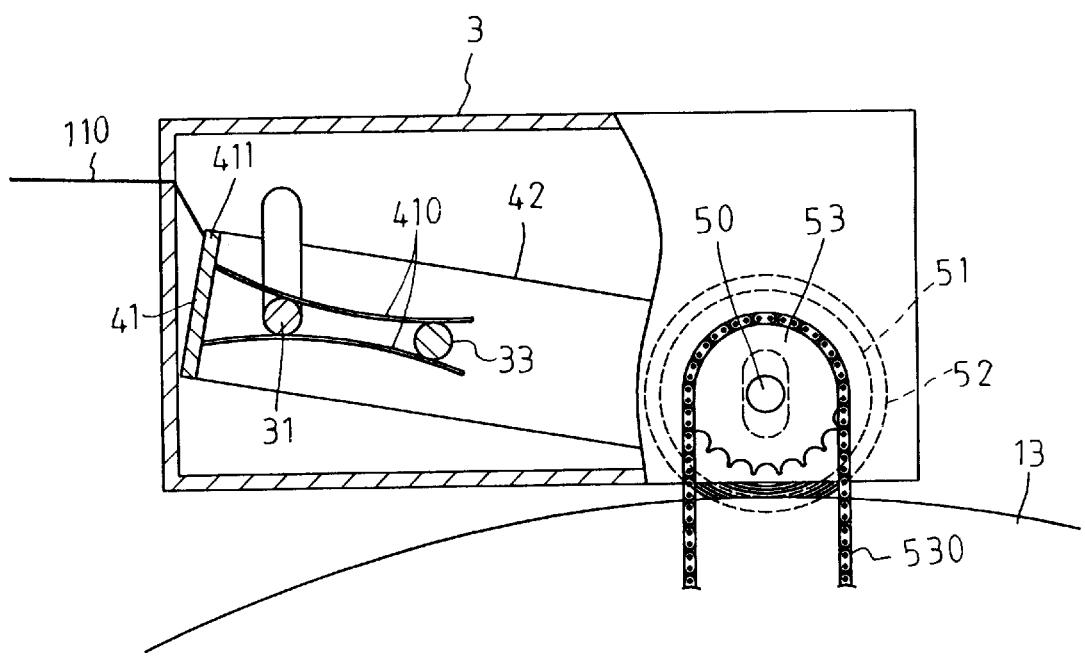
FIG. 4 is a partly sectional view of the preferred embodiment when a manually operated brake cable is pulled.

The carriage lever 4 is fulcrumed on the mounting rod 31, and includes a front lifted plate 41, and two rear depressed plates 42 which extend rearwardly and transversely from two ends of the front lifted plate 41 to define a rear depressed portion. A central rod 33 is mounted between the rear depressed plates 42, and is disposed parallel to the mounting rod 31. With reference to FIG. 4, the right manually operated brake cable 110 is connected to a front lifted portion of the front lifted plate 41. Four second biasing plates 410 have front connecting ends which are secured to the front lifted plate 41, and rear abutting ends which extend rearwardly from the front connecting ends so as to abut against the central rod 33.

The energy storage mechanism 5 includes a rear axle 50 which is disposed between the rear depressed plates 42 at the rear depressed portion and which is rotatable around a second rotating axis that is parallel to the pivot axis of the mounting rod 31. The rear axle 50 is provided with a frictional rotary member 51, two first biasing members 52, such as coil springs, which are disposed at two sides of the frictional rotary member 51, and a transmission sprocket wheel 53 which is coupled with the rear sprocket wheel 130 via a second drive chain 530.

As shown in FIGS. 2 and 6, the check mechanism 6 includes a casing 610 which is disposed on the mounting frame 3, two sliding grooves 611 which are formed in two sides of the casing 610 and which extend in a radial direction relative to the transmission sprocket wheel 53 to serve as keyways, a check member 612 with a protrusion 613 which projects toward the transmission sprocket wheel 53 and which is slidable along the sliding grooves 611, a third biasing member 614 which is disposed to abut against an inner wall of the casing 610 and the check member 612, and a swing rod 615 which is pivoted to the check member 612 and a connecting rod 616. The left manually operated check cable 111 is connected to the connecting rod 616.

Referring to FIG. 4, in combination with FIG. 1, when the bicycle 1 is in use, the rear sprocket wheel 130 is driven to rotate counterclockwise, and the transmission sprocket wheel 53 is rotated counterclockwise with the rear sprocket wheel 130 via the second drive chain 530 so as to actuate rotation of the rear axle 50. At this time, since the carriage lever 4 is in a first position, where the frictional rotary member 51 does not engage the rear tire, the frictional rotary member 51 rotates with the rear axle 50.

When it is desired to stop the bicycle 1, the right manually operated brake cable 110 is operated to pull the front lifted portion of the carriage lever 4 upwardly. The carriage lever 4 is moved from the first position toward a second position, where the rear depressed portion thereof is brought toward the rear tire such that the frictional rotary member 51 engages frictionally the rear tire to slow down the bicycle 1. At this time, the second biasing plates 410 are bent to bias against the central rod 33 to produce a restoring force. The frictional rotary member 51 is reversed to rotate clockwise, and transmits the rotation force to rotate the rear axle 50 clockwise, thereby permitting the first biasing members 52 to accumulate a biasing force.

Figure 3:
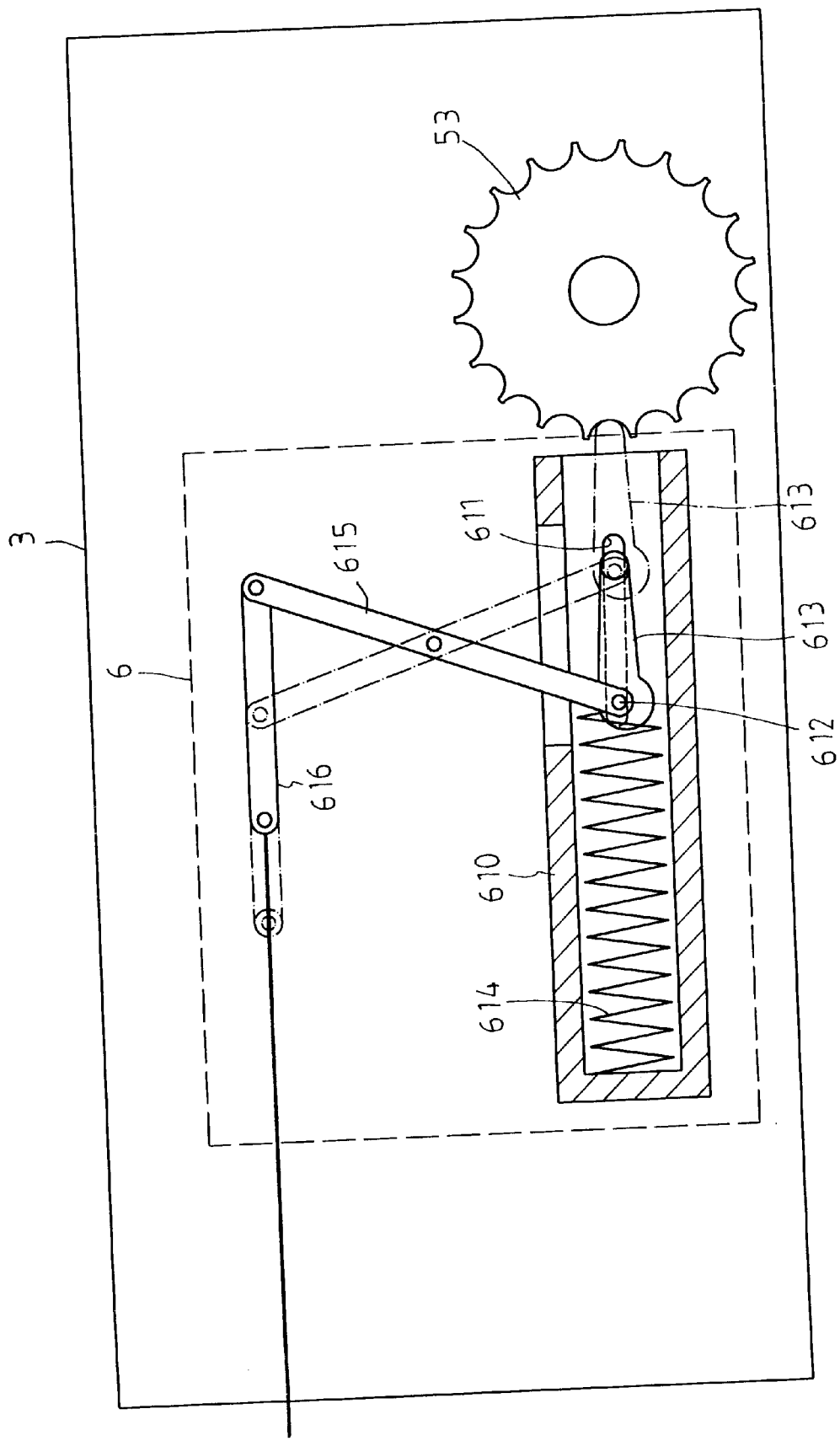
FIG. 3 is a partly sectional view of a check mechanism of the preferred embodiment.

With reference to FIG. 3, when the right manually operated brake cable 110 is released, the carriage lever 4 is biased to move toward the first position by the restoring force of the second biasing plates 410 such that the front lifted portion of the frictional rotary member 51 is disengaged from the rear tire. The rear axle 50 is simultaneously reversed to rotate counterclockwise by the biasing force of the first biasing members 52. As such, the user can accelerate easily the speed of the bicycle 1 due the accumulated biasing force upon release of the bicycle 1 from the braked state.

Moreover, for further retaining the accumulated biasing force when the right manually operated brake cable 110 is released, the check mechanism 6 is provided. When the bicycle 1 is braked and the biasing force of the first biasing member 52 accumulates, the left manually operated check cable 111 can be operated to pull the connecting rod 616 so as to swing the swing rod 615. The check member 612 is actuated to move from a release position, where the protrusion 613 is disengaged from the transmission sprocket wheel 53 (as shown in solid lines in FIG. 3), toward an arresting position, where the protrusion 613 is moved along the sliding grooves 611 to engage the transmission sprocket wheel 53 to arrest the latter (as shown in dotted lines in FIG. 3). In the arresting position, the third biasing member 614 is stretched. When the left manually operated check cable 111 is released, the check member 612 is pulled back toward the release position by the third biasing member 614 to permit the transmission sprocket wheel 53 to rotate due to the accumulated biasing force of the first biasing member 52.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A spurring device capable of accelerating the speed of a bicycle upon release of the bicycle from a braked state, the bicycle including a rear sprocket wheel that defines a first rotating axis, a rear wheel provided with a rear tire, and uni-directionally driven by the rear sprocket wheel to rotate counterclockwise, and a manually operated brake cable disposed to restrain the rear tire from rotation, said spurring device comprising:

a mounting frame adapted to be mounted above, and spaced apart from the rear tire, said mounting frame having front and rear ends spaced apart from each other in a longitudinal direction;

a carriage lever disposed in and pivotally mounted on said mounting frame around a pivot axis parallel to the first rotating axis, said carriage lever including a front lifted portion and a rear depressed portion opposite to each other relative to said pivot axis, and respectively proximate to said front and rear ends of said mounting frame, said front lifted portion being adapted to be pulled by the manually operated brake cable to move upwards for displacement from a first position to a second position such that when said front lifted portion is moved to said second position, said rear depressed portion is adapted to be brought towards the rear tire;

a rear axle disposed transverse to and rotatably mounted on said rear depressed portion around a second rotating axis which is parallel to said pivot axis;

a frictional rotary member mounted on and rotatable with said rear axle such that when said rear depressed portion is brought towards the rear tire, said frictional rotary member will be adapted to engage frictionally the rear tire so as to be driven thereby, together with said rear axle, to rotate clockwise;

a first biasing member disposed on said rear axle to accumulate a biasing force for urging said rear axle to rotate counterclockwise when said frictional rotary member is frictionally driven by the rear tire to rotate clockwise;

a second biasing member disposed to bias said front lifted portion to move to said first position; and a transmission sprocket wheel disposed to be rotatable with said rear axle and adapted to be coupled with the rear sprocket wheel so as to be driven by the rear sprocket wheel to rotate counterclockwise when said front lifted portion is not pulled by the manually operated brake cable, and to transmit rotation force of said rear axle which is driven by said first biasing member in order to drive the rear sprocket wheel to rotate counterclockwise once said front lifted portion is relieved from being pulled.

2. A spurring device as claimed in claim 1, wherein said mounting frame has a keyway which is oriented in a radial direction relative to said transmission sprocket wheel, further comprising:

a check member disposed on and movable relative to said mounting frame along said keyway between an arresting position where said check member engages said transmission sprocket wheel, and a release position where said check member is disengaged from said transmission sprocket wheel;

a manually operated check cable adapted to be mounted on the bicycle for pulling said check member from said release position to said arresting position along said keyway; and a third biasing member disposed to bias said check member to move from said arresting position to said release position.

* * * * *